United States Patent
Sawruk

[19]

[11] Patent Number: 6,098,402
[45] Date of Patent: Aug. 8, 2000

[54] INFRA-RED STEALTH MASKING DEVICE (IRSMD)

[76] Inventor: Stephen D. Sawruk, P.O. Box 431, Lanoka Harbor, N.J. 08734

[21] Appl. No.: 07/468,123

[22] Filed: Jan. 22, 1990

Related U.S. Application Data

[63] Continuation-in-part of application No. 07/309,084, Feb. 10, 1989, abandoned.

[51] Int. Cl.[7] ...................................................... F02K 11/00
[52] U.S. Cl. ............................ 60/267; 60/39.5; 239/127.1
[58] Field of Search ............................ 60/39.5, 266, 267; 181/213, 220, 221; 239/127.1, 127.3, 265.17

[56] References Cited

U.S. PATENT DOCUMENTS

| | | | |
|---|---|---|---|
| 2,990,905 | 7/1961 | Lilley | 181/220 |
| 2,991,617 | 7/1961 | Nerad et al. | 60/266 |
| 3,052,431 | 9/1962 | Compton | 60/267 |
| 3,092,205 | 6/1963 | Brown et al. | 181/213 |
| 3,100,627 | 8/1963 | Wilde | 181/220 |
| 3,251,552 | 5/1966 | Ford | 239/127.1 |
| 3,267,559 | 8/1966 | Laux | 60/266 |
| 3,267,664 | 8/1966 | Jones et al. | 60/267 |
| 3,349,464 | 10/1967 | Becker et al. | 239/127.1 |
| 3,618,701 | 11/1971 | Macdonald | 181/221 |
| 3,643,439 | 2/1972 | Petersen | 60/267 |

FOREIGN PATENT DOCUMENTS

| | | | |
|---|---|---|---|
| 2242799 | 3/1974 | Germany | 60/266 |
| 26529 | 7/1970 | Japan | 239/127.1 |

OTHER PUBLICATIONS

Webster's New World Dictionary of the American Language, 1957, p. 605, "geodesic".

*Primary Examiner*—Harold J. Tudor
*Attorney, Agent, or Firm*—Charles I. Brodsky

[57] ABSTRACT

An Infra-Red suppression device composed of systems designed to alter the infra-red spectrum bands produced by the exhaust plume and airframe friction in order to render infra-red seekers, both active and passive, and infra-red homing missiles ineffective, therefore substantially increasing air-craft and crew survivability, and the BET or battle extension time.

5 Claims, 8 Drawing Sheets

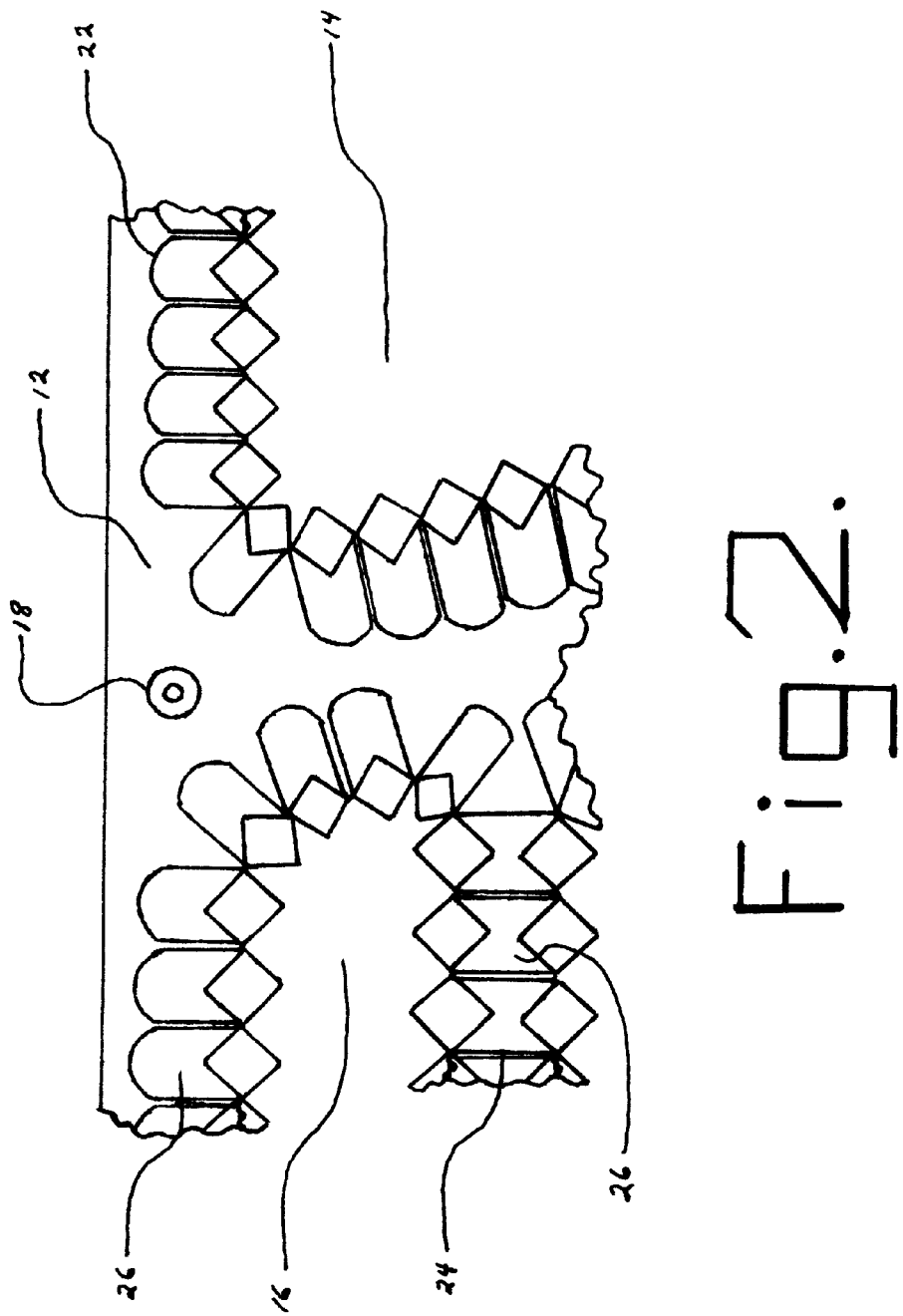

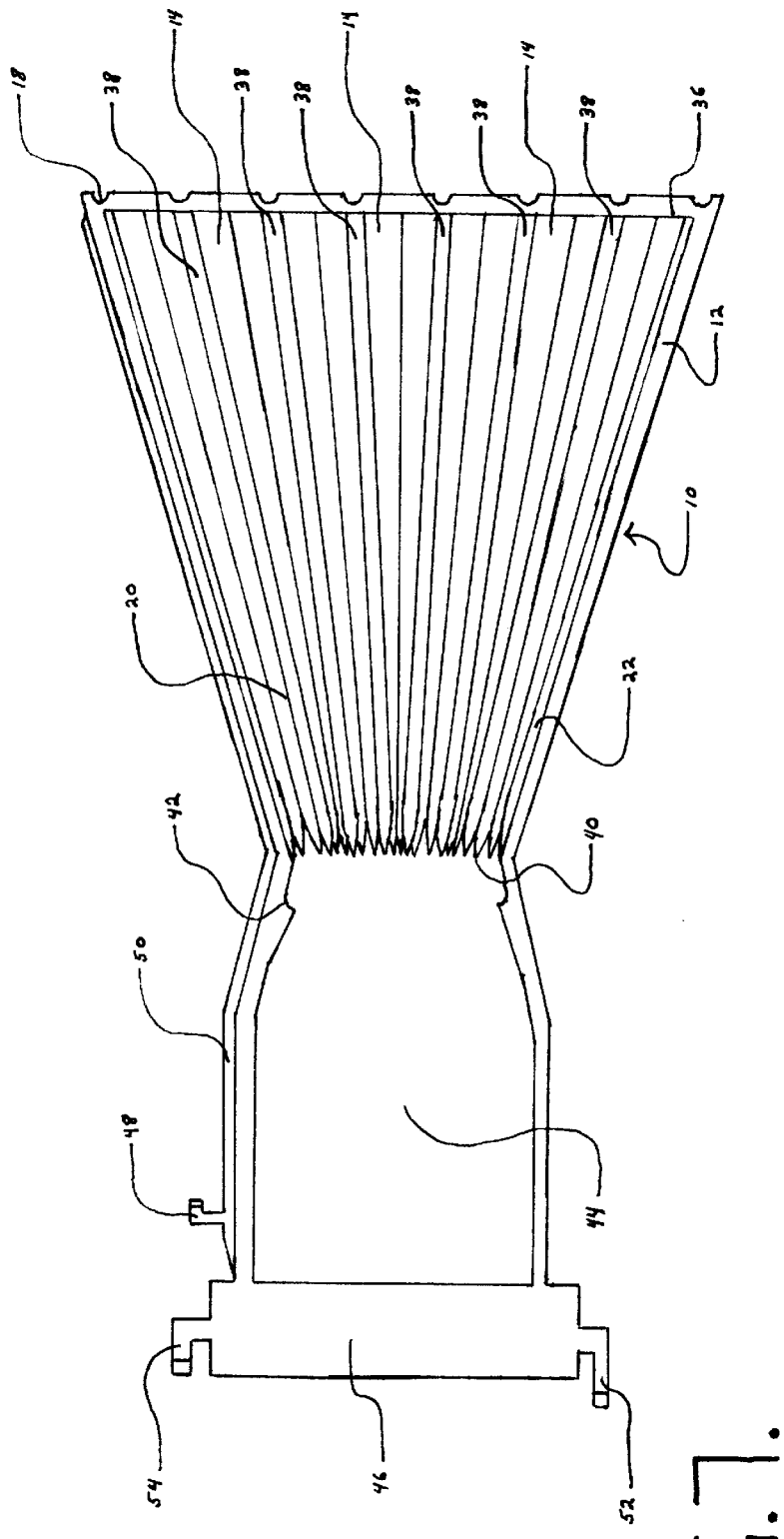

_INFRA-RED STEALTH MASKING DEVICE (IRSMD)_

THIS APPLICATION IS A CONTINUATION-IN-PART OF PATENT APPLICATION 07/309,084 FILED FEB. 10, 1989, NOW ABANDONED.

BACKGROUND OF THE INVENTION

1. Field of Invention

This invention relates generally to jet engines and more particularly to thrust chamber, reaction motor exhaust duct, and tailpipe cooling through a combination of heat dissipation via conduction transmission through a cryogenic non-propellant medium, injection of a cryogenic non-propellant medium, and ambient ram-air injection.

2. Description of the Prior Art

The plug-type exhaust system is widely known and it's main design feature is to block direct radiation of engine infrared, these systems solely rely upon air rammed by the fan or a ducted fan engine, collected by scoops to cool hot metal parts to reduce exhaust heat transmission to these parts. Plug-type exhaust systems also create turbine back-pressure penalties which result in power loss and heat build-up. Turbine cooling results in higher thrust output and efficiency in addition to cooling of the critical turbine blades. This has been accomplished by injecting a cryogenic fuel into the combustion chamber. This system can cause a fire hazard and more significantly does not suppress infrared emmissions. Heat exchangers have been employed using propellants as coolants situated in both the combustion chambers, thrust chambers, and exhaust ducts of reaction motors. Along with propellants, water has been suggested to circulate within channels or tubes machined into the walls of the aforementioned chambers and ducts. Cooling via the above regenerative cooling methods is well known. All of which are designed to cool-down the reaction motor walls and pre-heat the propellant(s). Also of interest is the design modification of the internal coolant channels in regenerative rocket combustors to improve combustor heat tolerance, enhance heat-transfer rates, and to extend the life-cycle of the components. All of the above cited references either do not address a solution for infrared thermal suppression, have limited-efficiency or cause turbine penalties. Most focus on combustion chambers. Furthermore, all of the systems cited use hazardous propellants as cooling mediums as opposed to inflammable cryogenic mediums. High exhaust temperatures of reaction motors must be countered with a volume of coolant at an absolute low temperature. Most importantly prior art depicts the exhaust duct as having smooth tapered walls which severely limit heat-transfer rates due to their limited surface area which is the medium for heat to coolant transfer. Other prior art known to the inventor does not disclose a device which will dissipate and significantly cool reaction motor exhaust, reduce exhaust decibels, and have no negative effect upon thrust and performance with regards to increasing turbine back-pressure.

Research in signature reduction techniques on aircraft have encompassed acoustic, optical, electronic, radar, and Infra-Red. Improvements have been made in all areas with the exception of Infra-Red (IR) suppression devices which are limited in efficiency. Infra-Red weapons systems are prolific worldwide both air-to-air and surface to air. As a measure of their impact, approximately 90 percent of all combat losses over the past 15 years are attributable to infra-red missiles.

The present system is designed for ATB (Advanced Tactical Bomber) and ATF (Advanced Tactical Fighter) stealth aircraft. Although applicable technology can be applied and refitted to any Military Aircraft, Surface Ships (Possibly Submersible Vessles) and Armored Vehicles.

The utility of the device is particularly great in Military Aircraft where detection by hostile forces is a prime and unwanted factor. The main concept is to elude look-up and look-down Infra-Red sensors as well as forward looking Infrared (FLIR) devices.

OBJECTS OF THE INVENTION

Consequently, it is an object of the present invention to provide an exhaust duct design for jet engines which will significantly cool exhaust gases to as near the ambient air temperature surrounding the aircraft as possible.

It is a further object of the present invention to provide an exhaust duct with a cryogenic coolant medium which is non-flammbale.

It is yet another object of the present invention to provide an exhaust duct configured to reduce exhaust decibel levels.

It is still another object of the present invention to provide an exhaust duct configured to reduce condensation trails.

It is even yet another object of the present invention to provide an exhaust duct configured to inject non-flammable cryogenic coolant medium throughout the exhaust duct.

It is still another object of the present invention to provide an exhaust duct of high durability with regards to high temperature and pressure variations.

It is yet another object of the present invention to provide an exhaust duct configured to provide maximum heat-transfer rates.

It is yet another object of the present invention to provide an exhaust duct which will have minimal effect on turbine back-pressure.

It is yet another object of the present invention to provide an exhaust duct configured to provide independent, self-contained, continuous flow cooling system.

It is yet another object of the present invention to provide a coolant cloak to mask the combustion chamber and it's hot metal parts.

SUMMARY OF THE INVENTION

These and other objects are achieved by the present invention which provide a geodesic matrix within the entire exhaust duct containing injector nozzles for cryogenic coolant. The matrix will also provide external and internal saw-toothed triangular ridges. By such arrangement, the internal surface area of the exhaust duct in direct contact with hot gases will greatly increase, thus maximizing heat transfer. At the same time, the internal triangular ridges, with increased surface area, will transfer this heat efficiently to coolant chambers within the matrix.

The above and yet other objects and advantages of the present invention will become apparent from the hereinafter set forth detailed description of the invention, the drawings, and claims appended herewith.

BRIEF DESCRIPTION OF THE DRAWINGS

FIG. 2. is an enlarged cross sectional view of a segment of the exhaust duct wall and coolant chambers constructed according to the preferred embodiment of the present invention.

FIG. 7. is a superior partially cutaway perspective view of the exhaust duct constructed according to the preferred embodiment of the present invention.

The same elements or parts throughout the figures of the drawings are designated by the same reference characters, while equivalent elements of the prior art bear a prime designation.

DETAILED DESCRIPTION OF THE PREFERRED EMBODIMENT

Figure 1:
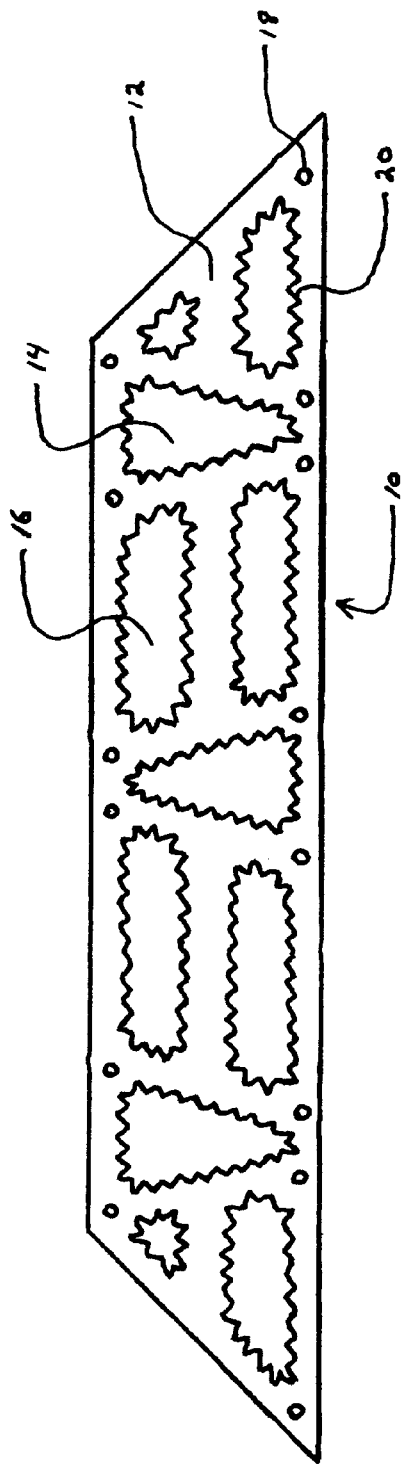
FIG. 1. is a posterior view of the distal end of the exhaust duct having a geodesic matrix pattern and external saw-toothed configuration constructed according to the present invention.

Referring to FIG. 1, there is shown a posterior view of the distal end of the exhaust duct generally designated 10 for a jet reaction motor. Exhaust duct 10 contains an outer wall 12 as a supportive structure which is contigeous with the vertical exhaust chambers 14 and the horizontal exhaust chambers 16 of which a total of eleven of both type exhaust chambers are shown. The contigeous walls contain coolant chambers extending the entire length of the exhaust duct 10 which are not illustrated in this particular view. External ejector nozzle outlets 18, of which fourteen are shown, will dispense a non-flammable cryogenic coolant composed of liquid helium or nitrogen. Liquid helium is preferred due to it's cooler temperature. Upon ejection, the liquid coolant will instantly vaporize and mix with the exhaust gases resulting in cooler engine exhaust emissions. The cryogenic supply for the ejector nozzles outlets 18 has an independent storage source, not shown. It should be noted that the exhaust duct wall 12 and it's contigeous structure including the vertical exhaust chambers 14 of which three are shown, and the horizontal exhaust chambers 16 of which eight are shown, which also contain saw-toothed ridges 20 running the entire length of the exhaust duct, form a geodesic matrix pattern which tends to obscure the hot metal parts of the engine from various viewing angles while at the same time this configuration increases the exhaust exit perimeter which generates vortices thereby enhancing exhaust mixing with the cooler ambient air surrounding the aircraft.

Referring to FIG. 2, is an enlarged cross-sectional view of a segment of the exhaust duct wall 12 and coolant channels composed of singularly opposed saw-toothed coolant channels 22 and coolant channels composed of doubly opposed saw-toothed channels 24. These coolant channels 22 and 24 extend longitudinally throughout the length of the exhaust duct wall 12, not shown, with the singularly opposed saw-toothed channels 22 comprising the majority placed around the inner periphery of the exhaust duct walls 12 and the inner periphery of the vertical exhaust chambers 14. The doubly opposed saw-toothed channels 24 are placed horizontally and bisect the horizontal exhaust chambers 16. Coolant channels 26 are also shown as containing triangular ridges 28 constructed according to the present invention. The coolant channels 26 continually circulate cryogenic coolant fluid throughout the contigeous exhaust duct walls 12 and vertical exhaust chambers 14 as well as the horizontal exhaust chambers 16. Cryogenic coolant flow through the coolant channels 26 cools the contigeous exhaust duct walls 12 and also cools the jet engine exhaust. External ejector nozzle outlets 18, one shown, are positioned around the distal periphery of the exhaust duct 10 to provide symetrical ejection of the cryogenic coolant at a zero to forty-five degree angulation inward towards the exhaust flow. The angulation will depend upon engine(s) type, thrust, and aircraft design.

Figure 3:
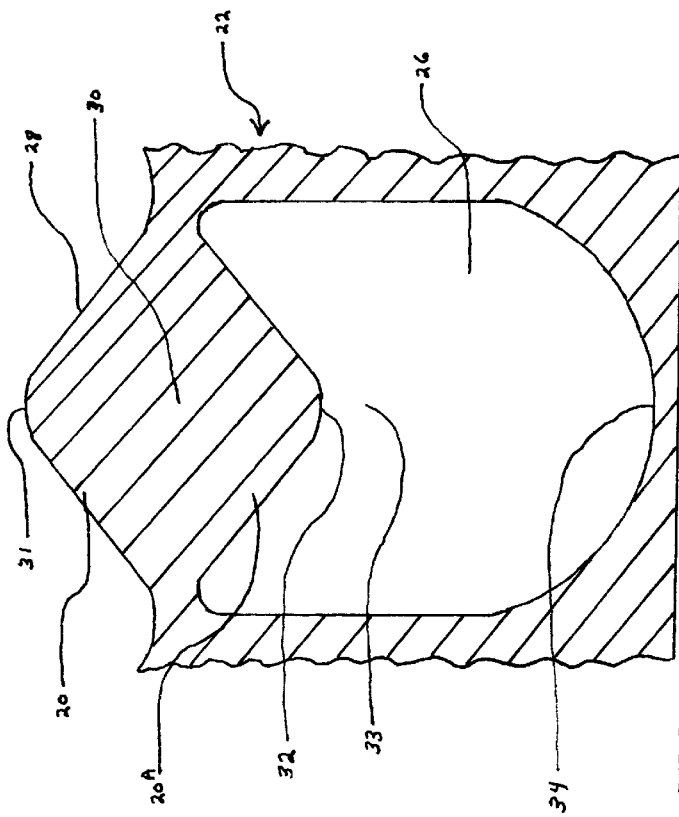
FIG. 3. is a further enlarged cross-sectional view of a segment of the exhaust duct wall and coolant chamber constructed according to the preferred embodiment of the present invention.

Referring to FIG. 3, is a further enlarged cross-sectional view of a singularly opposed saw-toothed channel 22 and coolant channel 26. The present invention provides a hot-side surface 28 which is the interior surface of exhaust duct wall 12. This design virtually eliminates bowing of the section of the coolant channel 30 towards the hot-side surface 28. Bowing is caused by extreme pressure and temperature variations caused by hot exhaust gases which range from 600–1500 degrees Fahrenheit as well as the internal pressure within the coolant channels which range from 5000–7500 PSI. The singularly opposed saw-toothed channel 22 is ideally constructed for heat transfer, from hot-side apex 31 through coolant chamber side apex 32. This is evident in construction of the hot-side saw-toothed ridge 20 which has an increased surface area for heat transmission, as opposed to prior art coolant channels with their flat hot-side walls, and the coolant-side saw-toothed ridge 20A whose apex 31 is located at the radially inward area of the coolant channel 33 for maximum heat absorbtion by the cryogenic medium coolant contained in the coolant channel 26. The floor 34 of the coolant channel 26 is constructed without corners or right angles as is the entire inner surface of the coolant chamber 26. This allows for a greater volume of circulating cryogenic coolant medium and minimizes friction caused by flow conditions within the coolant channel 26. It should also be noted that the hot-side surface 28 of the coolant channel 26 is machined to form a smooth tapered configuration resistant to scarfing or roughening of the hot-side surface 28 caused by rapidly moving exhaust gases passing over their surface. This machining along with the boundary layer of gases along the hot-side surface 28 will control scarfing. The opposed saw-toothed coolant ridges will be machined to a 30–60 degree angulation.

Figure 4:
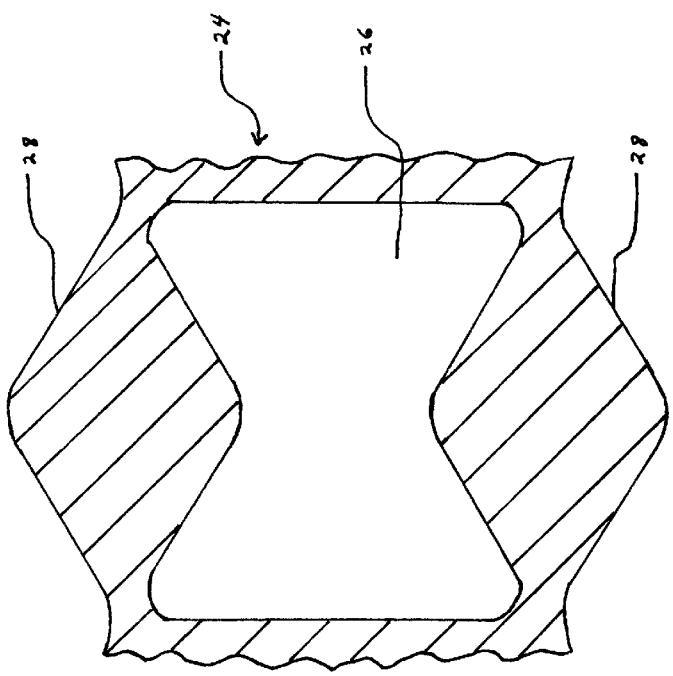
FIG. 4. is another enlarged cross-sectional view of a segment of the exhaust duct wall and coolant chamber constructed according to the preferred embodiment of the present invention.

FIG. 4, is another enlarged cross-sectioned view of a doubly opposed saw-toothed channel 24 and coolant channel 26. The same principles apply in this preferred construction as with the preferred construction of the singularly opposed saw-toothed channel 22 and coolant channel 26 with the exception that two hot-surface sides 28 are being cooled simultaneously.

Figure 5:
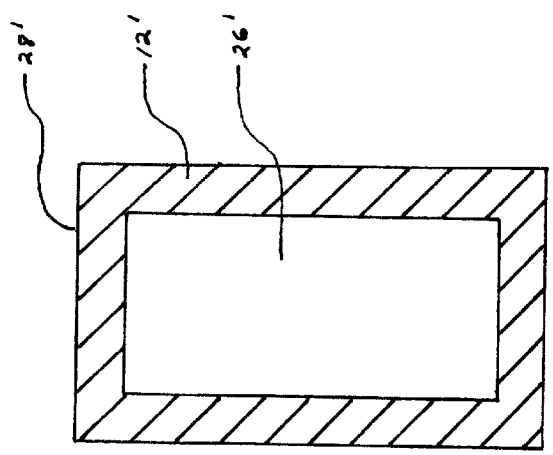
FIG. 5. is an enlarged cross-sectional view of a combustion wall and coolant channel constructed according to prior art.

FIG. 5, is a prior art design coolant channel found within the combustor or duct wall 12'. The coolant channel 26' contains a coolant composed of a propellant(s) such as liquid hydrogen which is extremely flammable. The hot-side surface 28' is essentially flat limiting the surface area for heat transmission. This prior art design is prone to failure due to heat build-up and or loss of structural integrity by either making the hot-side surface 28' too thick or to thin. Narrowing the coolant channels 26 to structurally strenghten the channels results in restriction of coolant flow. The right-angled construction of the prior art coolant channel 26' also promotes friction and a negative effect on coolant flow.

Figure 6:
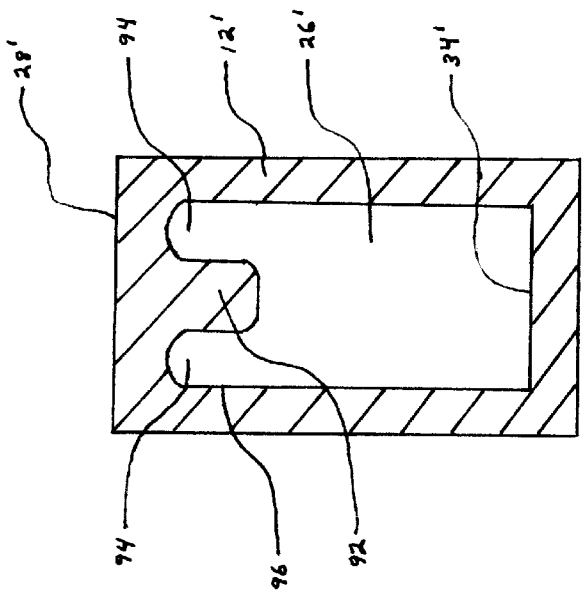
FIG. 6. is another enlarged cross-sectional view of a combustion wall and coolant channel constructed according to prior art.

FIG. 6, is another prior art design coolant channel found within the combustor or duct wall 12'. This design is a significant improvement over the prior art described in FIG. 5. The coolant channel 26 contains a coolant again composed of a propellant(s) such as liquid hydrogen, again extremely flammable, the hot-side surface 28' remains essentially flat which limits the surface area for heat transmission. This design is not as prone to hot-side surface 28' failure due to the addition of Keel-Ribs 92 which extend into the coolant channel 26 and provide both structural integrity and heat transfer from the hot-side surface 28' to the coolant channels 26. Arcuate flutes 94 are also provided on either side of the keel-ribs 92 for continuous surface transition between the keel-ribs 92 and adjoining surfaces 96 of the coolant channels 26'. This design allows wider coolant channels and improved flow conditions within the coolant channel 26'. The keel-ribs 92 also provides improved heat transmission to the coolant medium. However, this design still contains two right angles within the coolant channel 26' at the opposing walls of the floor 34' of the coolant channel 26' which continues to promote friction and a negative effect on coolant flow.

FIG. 7, is a superior partially cutaway view of the exhaust duct 10 along an equatorial plane. Singularly opposed saw-toothed channels 22, of which sixteen are shown, run the entire length of the exhaust duct 10 and are integrated into the contigeous exhaust duct walls 12 and floor 36 of the exhaust duct 10. The vertical exhaust chambers 14, of which three are shown, are demarcated by their contigeous walls 38 of which six are shown. It is to be understood that the saw-toothed ridges 20 are machined to have no sharp edges and to have its triangular sides convergently taper to an apex 40, thus creating a smooth, reduced turbulence exhaust stream with minimal creation of turbine back-pressure. This configuration combined with the overall design of the matrix tends to create a baffle effect upon the exhaust which consequently reduces the acoustic signature of the aircraft.

The internal cryogenic injector nozzle outlets 42, of which two are shown, are positioned forward of the exhaust duct 10 and are controlled by computor link-up, not shown, which also monitors, via sensors within the cooling system, again not shown, temperature and pressure variations within the cooling system and is known prior art. The mechanism for internal injection and external ejection of cryogenic coolant, that being feed/activator nozzles, are not shown and are known prior art.

The on board computor, not shown, will also control specifically timed pulsed bursts of cryogenic coolant in controlled volumes through the internal injector nozzle outlets 42 that will mix with and cool down the hot exhaust gases and not impede engine thrust. This system may only be activated in a high-threat environment. It is to be understood that additional cooling of the hot exhaust gases may be accomplished by incorporating a ram-air serpentine duct system, not shown, which will communicate outside ambient air with the exhaust chambers contained within the exhaust duct 10 which is known prior art.

Moving forward of the internal injector nozzle outlets 42 is to be found the cloaking chamber 44. This chamber will completely encompass the engine(s) combustion and thrust chamber, not shown, which will be inserted into the cloaking chamber 44 and will be secured, not shown. The cloaking chamber 44 is part of the contigeous walls 12 of the exhaust duct 10. The walls of the cloaking chamber will contain horizontally opposed, radially orientated, with respect to the axis of the cloaking chamber, elliptical coolant channels, not shown, which encompass the entire length and circumference of the cloaking chamber 44. These elliptical coolant channels, not shown, are in direct communication with the coolant manifold 46 and are part of the continuous flow coolant system between the saw-toothed coolant chambers found within the exhaust duct 10 and the coolant manifold 46. The cloaking chamber 44 is designed to shield or mask the hot engine parts from outside detection of their radiated heat. It should be understood that the cloaking chamber 44 may be modified or adapted to form the actual combustor chamber and thrust chamber walls complete with saw-toothed configurations and coolant channels of the preferred embodiment, not shown. It should further be understood that the aforementioned modification could result in a regenerative cooling system by employing liquid propellant(s) within a self contained combustor wall and thrust chamber wall system, again not shown, where the propellant(s) are injected into the combustion chamber which is known prior art.

An inlet means 48 is shown at the junction of the manifold 46 and cloaking chamber 44. This inlet means 48 supplies cryogenic coolant from an independent source, not shown, for the internal injector nozzle outlets 42, two are shown, and the external ejector nozzle outlets 18, of which eight are shown, via connection to a flow rib 50. The manifold inlet means 52 supplies cryogenic coolant from an independent source, not shown, for the entire continuous flow cooling system composed of the elliptical coolant channels, not shown, and the coolant channels found throughout the exhaust duct 10. The manifold outlet means 54 returns circulated coolant to it's independent source, not shown. It is to be understood that the aforementioned cooling system with its coolant channels forms a complete continuous flow circuit by means of inlet and outlet ducts at the proximal and distal ends of the coolant channels, which ducts are not shown.

It is to be further understood that the independent cryogenic coolant sources, which sources are not shown, is contained in two wafer storage tanks configured to fit or mold into the internal aircraft wing configuration at the leading edge of the wing and at the trailing edge of the wing along it's entire length. The leading edge tank will supply the cooling system and trailing edge tank will supply the injector/ejector system. These cryogenic coolant tanks will interphase with the wing fuel tanks which will act as a heat sink which is known prior art. This will lower the infra-red energy emitted and caused by airframe friction. The heat from air friction, normally emitted in the 3–4 and 8–12 micron range in the infra-red spectrum, would be absorbed by the cryogenic coolant tanks in contact with the aircraft skin. The absorbed heat from both air friction and the returned coolant from the coolant channels would be transferred or exchanged into the fuel tanks. The heated fuel would then be burned in it's pre-heated state which leads to better combustion properties.

Figure 8:
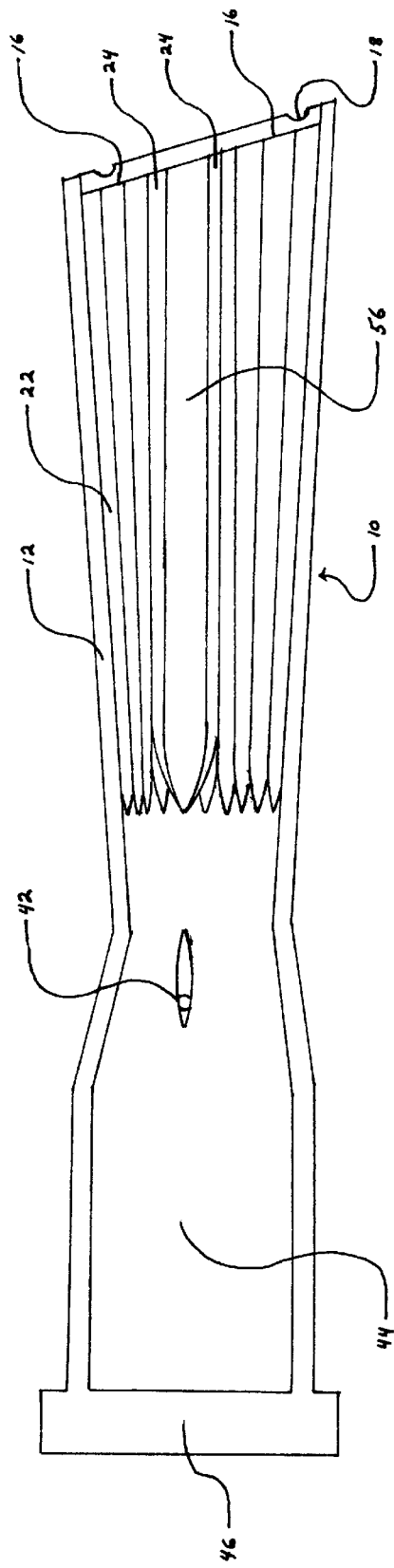
FIG. 8. is a lateral partially cutaway view of the exhaust duct constructed according to the preferred embodiment of the present invention.

Referring to FIG. 8, is a lateral partially cutaway view of the exhaust duct 10 along a longitudinal plane. Starting at the proximal end of the cooling system we have the coolant manifold 46 followed by the cloaking chamber 44. This is followed by the internal injector nozzle outlets 42, of which one is shown. The contigeous exhaust duct walls 12 encompass the singularly opposed saw-toothed channels 22 of which nine are shown along the duct wall 12 and the doubly opposed saw-toothed channels 24 of which two are shown. The horizontal cross-member 56 which contains the doubly opposed saw-toothed channels 24 lies between the upper and lower horizontal exhaust chambers 16 of which two are shown. External ejector nozzle outlets 18 of which two are shown are also controlled by computor link-up not shown, or manually activated by the pilot or weapons officer. Ejection of the cryogenic coolant will occur in high-threat areas or when an infra-red homing device activates a positive threat warning alarm. The ejection of cryogenic coolant will burst-down or lower the exhaust temperature at it's exit from the exhaust duct system 10.

It should be noted that the relationship between the range at which infra-red seeker lock-on, RLO, will occur and the aircraft radiant intensity is governed by the square root of the aircraft's radiant intensity. This can be mathematically expressed as RLO=[I/(L SMIN (NEFD)]·5 where I is the aircraft's radiant intensity at the aircraft in the direction and bandwidth of the infra-red seeker, L is the atmospheric losses or attenuation while propagating the distance RLO, SMIN is the minimum signal-to-noise required for target lock-on, and NEFD is the noise equivalant irradiance at the seeker that produces a signal equal to the internal noise. The aircraft propulsion system produces strong infra-red signatures in a few bands as a result of the larger amounts of carbon dioxide and water in their hot exhaust. Once these hot gases are expelled from the engine, the atmosphere may scatter, absorb, or transmit the radiation from the carbon dioxide and water. Scattering and absorbtion will generally deplete or attenuate the levels of this emitted radiation. For both water and carbon dioxide, the infra-red bands that have the greatest absorbtion and emissivity are virtually the same.

Because both these gases are in the jet engines exhaust, a large amount of energy is radiated in these few bands. Ideally, the carbon dioxide and water in the atmosphere would absorb this radiated energy because of the relationship between emission and absorbtion. However, the significant differences between the pressure and temperatures of the atmosphere and that of the exhaust will result in a difference between the emission and absorbtion characteristics. For example, one primary absorbtion band for atmospheric carbon dioxide is 4.3 microns, whereas the carbon dioxide from the jet engine exhaust is typically between 4.1 to 4.5 microns. Thus, the majority of the carbon dioxide will be absorbed by the atmosphere around 4.3 microns, leaving large spikes of residual energy on either side of this band, 4.1 microns and 4.5 microns. This non-absorbed energy is significant because carbon dioxide makes up the majority of the jet engine exhaust and the 4.3 micron band is one of the infra-red bands which passive infra-red threat systems can exploit.

One other key factor influencing the absorbtion of both water and carbon dioxide is altitude. The relative amounts of each gas are reduced with altitude, but the concentration of water is much more drastically affected by altitude. For example, the amount of water present at 20,000 feet is less than 20 per cent of that at sea level, whereas carbon dioxide will have the same relative concentration at 40,000 feet. These relative concentrations are also indicators of the relative absorbtion expected at those altitudes. Thus, at sea level, absorbtion of both gases is rather extensive, and as altitude increases the absorbtion levels for water and carbon dioxide diminish rapidly, with water suffering the most dramatic reduction in absorbtion capability by the atmosphere. Consequently, the lock-on range goes up as the seeker/aircraft altitude goes up.

While flares or dispensibles are presently used by aircraft in the hope of offering an infra-red homing missile an alternative target, the present preferred embodiment will alter the infra-red spectrum so as to render infra-red seekers ineffective. For as the exhaust temperature decreases, the overall bandwidth of transmitted energy decreases. Additionally, as the temperature decreases, the peak intensity of the energy spectrum shifts to longer wavelengths. In addition, the cooler exhaust created by the preferred embodiment will reduce the formation of condensation trails or contrails caused by hot engine exhaust at high altitude and therefore reduce the visual or optical signature of the aircraft.

Figure 9:
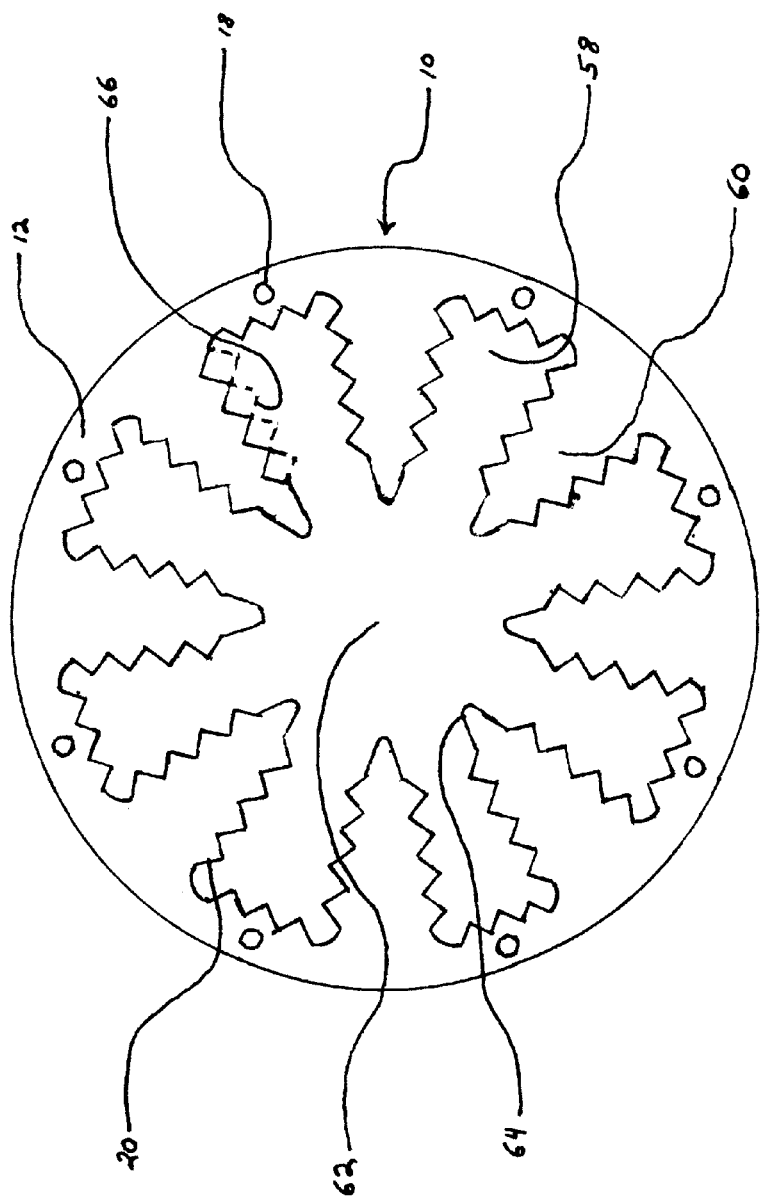
FIG. 9. is a posterior view of the distal end of the exhaust duct constructed according to another embodiment of the present invention.

Referring to FIG. 9, is a posterior view of the distal end of the exhaust duct 10 constructed according to another embodiment. This embodiment is designed for present production aircraft. The external ejector nozzle outlets 18, of which eight is shown, are shown in a symetrical dispersal pattern. The contiguous duct walls 12 again form the supportive structure and house the coolant channels, not shown. Longitudinal exhaust chamber outlets 58, of which eight are shown, lie between the coolant fins 60 which run the entire length of the exhaust duct 10, not shown.

The main exhaust chamber outlet 62 is centrally located. Saw-toothed ridges 20, of which eighty-eight are shown run the entire length of the exhaust duct 10, not shown. In this particular embodiment the singularly opposed saw-toothed coolant channels 22, not shown, are utilized throughout the exhaust duct 10 with the exception of the two coolant channels which are doubly opposed saw-toothed channels 24, not shown, located closest or proximal to the coolant fin apex 64. Internal juxtaposition of the opposed heat transfer ridges, four are shown, is shown in a brief cutaway view 66 of the coolant fin 60 and is demarcated by the dashed lines.

Figure 10:
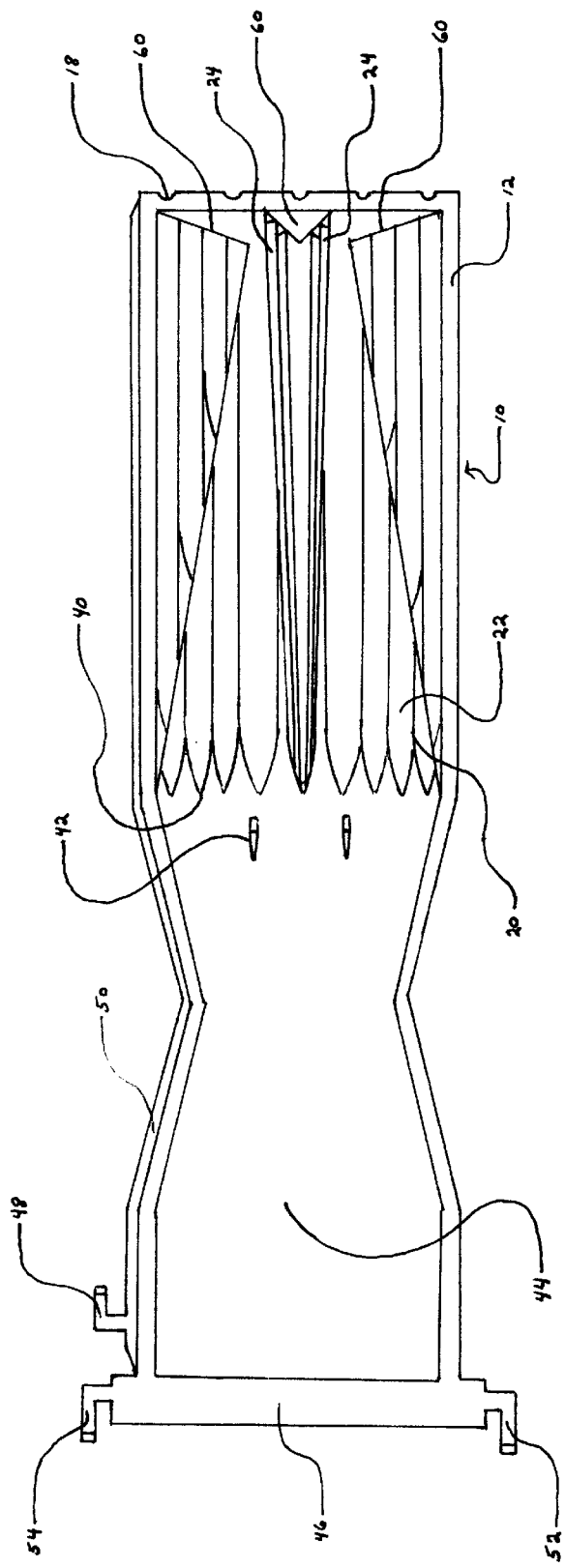
FIG. 10. is a superior partially cutaway view of the exhaust duct constructed according to another embodiment of the present invention.

Referring to FIG. 10, is a superior partially cutaway view of the exhaust duct 10 along an equatorial plane constructed according to another embodiment. This embodiment is designed for present production aircraft and relates to the preceeding drawing. Beginning at the proximal end of the exhaust duct 10 we have the coolant manifold 46 with manifold inlet means 52 and manifold outlet means 54. The cloaking chamber 44 is shown. The inlet means for the internal injector nozzle outlets 42, of which two are shown, and the external ejector nozzle outlets 18, of which five are shown are connected by the flow rib 50. The contiguous exhaust duct wall 12 is shown with the singularly opposed saw-toothed coolant channels 22, of which sixteen are shown, and the doubly opposed saw-toothed coolant channels 24, of which four are shown, extending the length of the exhaust duct 10. The coolant fins 60, of which three are shown, extend the length of the exhaust duct 10 and are machined to convergenty taper, as are the saw-toothed ridges 20 to form an apex 40 which is smooth surfaced to not impend thrust flow and create turbine back-pressure.

It should be understood that the present preferred embodiment is a complex system made up of multiple subsystems which may be used in whole or in part to accomplish various missions with regard to infra-red suppression on a variety of vehicles. An example of which would be external cryogenic ejector nozzles applied to rotary aircraft exhaust pipes.

It should be further understood that the preferred embodiment will be constructed of classified metallic alloys containing strategic metals to produce a lightweight, highly thermal conductive system able to withstand extreme temperatures, heat flux, and pressure variations.

It should also be further understood that the production of the preferred embodiment will include machining as previously described, hot metal extrusion through a shaped die, and hogging, cutting from solid metal. This will increase the local or directional strength of the metallic alloys and also extend the fatigue life as well as the prevention of scarfing.

It should also be further understood that the present embodiment may be additionally computer linked to an ambient air temperature sensor and an exhaust temperature sensor, of which prior art is known. Thus, the on-board computer can additionally regulate the coolant flow rate, coolant injection rate and volume, coolant ejection rate and volume, and ram-air flow rate, to constantly match the ambient air temperature with the exhaust temperature and create thermal equilibrium to the highest physical degree possible.

Accordingly, while there has been shown and described the preferred embodiments of the present invention, it is to be appreciated and understood that the invention may be embodied otherwise than is herein specifically shown and described and that, within the scope of such embodiments, certain changes may be made within the detail and construction of the part(s) without departing from the under-lying ideas or principles of this invention with-in the scope of the appended claims.

PATENT REFERENCES CITED

U.S. Pat. No. 2,935,841 May 1960 MEYERS ET AL - - - 60/266

U.S. Pat. No. 2,991,617 July 1961 NERAD ET AL - - - 60/266

U.S. Pat. No. 3,241,310 March 1966 HOADLEY ET AL - - - 60/267

U.S. Pat. No. 3,600,890 August1971 WHITE ET AL - - - 60/267

U.S. Pat. No. 3,970,252 July 1976 SMALL ET AL - - - 60/266

U.S. Pat. No. 3,981,143 September 1976 ROSS ET AL - - - 60/266

U.S. Pat. No. 4,781,019 November 1988 WAGNER - - - 60/267

Having thus described my invention, what I claim as new, useful and non-obvious and, accordingly, secure by Letters Patent of the United States is:

1. An Infra-Red suppression system for an aircraft jet engine having an exhaust duct network in which exhaust duct walls surround an exhaust duct chamber, comprising:

a. A matrix within said exhaust duct, including an array of longitudinal triangular saw-tooth ridged coolant channels disposed within said exhaust duct walls;

b. A source of non-flammable cryogenic coolant;

c. Injection and ejection means on said matrix for dispersing said cryogenic coolant within said exhaust duct chamber and without said exhaust duct walls; and d. An integrated cloaking chamber within said exhaust duct walls to shield heated engine parts from outside detection; and wherein said longitudinal triangular ridged coolant channels contain a singularly opposed saw-toothed configuration for transfer of heat from a hot-side surface of said exhaust duct chamber to said coolant channels contained within said exhaust duct walls.

2. An Infra-Red suppression system for an aircraft jet engine having an exhaust duct network in which exhaust duct walls surround an exhaust duct chamber, comprising:

a. A matrix within said exhaust duct, including an array of longitudinal triangular saw-tooth ridged coolant channels disposed within said exhaust duct walls;

b. A source of non-flammable cryogenic coolant;

c. Injection and ejection means on said matrix for dispersing said cryogenic coolant within said exhaust duct chamber and without said exhaust duct walls; and d. An integrated cloaking chamber within said exhaust duct walls to shield heated engine parts from outside detection; and wherein said longitudinal triangular ridged coolant channels contain a doubly opposed saw-toothed configuration for transfer of heat from a hot-side surface of said exhaust duct chamber to said coolant channels contained within said exhaust duct walls.

3. An Infra-Red suppression device, comprising:

a. A matrix within an exhaust duct of an aircraft jet engine;

b. A longitudinal triangular ridged coolant channel system disposed within said exhaust duct;

c. A source of cryogenic coolant;

d. An injection and ejection system for dispersing said cryogenic coolant within and without said exhaust duct;

e. An integrated cloaking chamber within said exhaust duct to mask combustion and thrust chambers of said engine; and f. In which said longitudinal triangular ridged coolant channel system contains a singularly opposed saw-tooth configuration for transfer of heat from a hot-side surface of said exhaust duct to said coolant channels contained within said exhaust duct.

4. The device as recited in claim 3 in which said longitudinal triangular ridged coolant channels also contain a doubly opposed saw-tooth configuration for transfer of heat from a hot-side surface of said exhaust duct to said coolant channels contained within said exhaust duct.

5. An Infra-Red suppression device, comprising:

a. A matrix within an exhaust duct of an aircraft jet engine;

b. A longitudinal triangular ridged coolant channel system disposed within said exhaust duct;

c. A source of cryogenic coolant;

d. An injection and ejection system for dispersing said cryogenic coolant within and without said exhaust duct;

e. An integrated cloaking chamber within said exhaust duct to mask combustion and thrust chambers of said engine; and f. In which said longitudinal triangular ridged coolant channels contain a doubly opposed saw-tooth configuration for transfer of heat from a hot-side surface of said exhaust duct to said coolant channels contained within said exhaust duct.

* * * * *